(12) United States Patent
Spyropoulos

(10) Patent No.: US 10,042,826 B2
(45) Date of Patent: Aug. 7, 2018

(54) METHOD FOR REFERRING TO SPECIFIC CONTENT ON A WEB PAGE AND WEB BROWSING SYSTEM

(71) Applicant: Unify GmbH & Co. KG, Munich (DE)

(72) Inventor: Georgios Spyropoulos, Athens (GR)

(73) Assignee: Unify GmbH & Co. KG, Munich (DE)

( * ) Notice: Subject to any disclaimer, the term of this patent is extended or adjusted under 35 U.S.C. 154(b) by 123 days.

(21) Appl. No.: 14/859,651

(22) Filed: Sep. 21, 2015

(65) Prior Publication Data

US 2016/0147718 A1    May 26, 2016

(30) Foreign Application Priority Data

Nov. 26, 2014   (EP) ...................................... 14003988

(51) Int. Cl.
```
G06F 3/00       (2006.01)
G06F 17/22      (2006.01)
G06F 3/0481     (2013.01)
G06F 17/30      (2006.01)
```
(52) U.S. Cl.
CPC ...... *G06F 17/2235* (2013.01); *G06F 3/04812* (2013.01); *G06F 17/30905* (2013.01)

(58) Field of Classification Search
CPC ......... G06F 17/30864; G06F 17/30011; G06F 17/30882; G06F 17/30893; G06F 17/30699; G06F 17/30867; G06F 17/30058; G06F 17/30905; G06F 17/2235; G06F 3/04812
See application file for complete search history.

(56) References Cited

U.S. PATENT DOCUMENTS 8,352,573 B2    1/2013  Chandra
2014/0351236 A1* 11/2014 Zhu ................... G06F 17/30864
                                                 707/709

FOREIGN PATENT DOCUMENTS

WO     WO 2014/082753    *  6/2014  ............... G06F 9/00

OTHER PUBLICATIONS

"Highlight File Format", Jul. 31, 2003, pp. 1-8, XP055186092; https://partners.adobe.com/public/developer/en/pdf/HighlightFileFormat.pdf.
"The Technology behind LiveURLs" dated Apr. 19, 2014, https://web.archive.org/web/20140419012159/http://liveurls.mozdev.org/tech.html.
Office action for European Patent Application No. 14003988.4 dated Jun. 14, 2018.

* cited by examiner

*Primary Examiner* — Kyle Stork
(74) *Attorney, Agent, or Firm* — Buchanan Ingersoll & Rooney PC

(57) ABSTRACT

A method for referring to specific content on a web page includes addressing the web page by way of a URL. At least one extra part of the URL contains information on the specific content to be referred to on the web page. When the one extra part of the URL is disregarded, the web page is addressed by way of the URL in that the specific content to be referred to on the web page is disregarded. When the one extra part of the URL is acted upon, the specific content identified by the extra part is highlighted to a user via a browser's generation of the web page based on the extra part of the URL.

19 Claims, 3 Drawing Sheets

METHOD FOR REFERRING TO SPECIFIC CONTENT ON A WEB PAGE AND WEB BROWSING SYSTEM

CROSS-REFERENCE TO RELATED APPLICATION

The present application claims priority to European Patent Application No. 14003988.4, which was filed on Nov. 26, 2014. The entirety of this European patent application is incorporated by reference herein.

FIELD OF THE INVENTION

Embodiments of the invention relates to a method for referring to specific content on a web page and systems configured to implement the method.

BACKGROUND OF THE INVENTION

In case of a user being interested in content on a web page the Uniform Resource Locator (URL) corresponding to the web page is inputted into a browsing program or activated by clicking a link and the web page is displayed to the user via a display device (e.g. a computer monitor or display of an electronic device or peripheral device connected to the electronic device). The problem arises when the user wants to refer to specific content, like a keyword, a phrase or a section, in the web page.

Known web browsing systems only provide insufficient solutions for said problem. Single browsing programs, like add-ons in Chrome (Yellow Highlighter Pen For Web) and in Firefox (Highlights), provide similar functionality but not any global solution. Another partial solution is given by U.S. Pat. No. 8,352,573, which relates to a method and an apparatus for automatically embedding and emailing user-generated highlights. But, this solution requires an additional highlighting service server.

SUMMARY OF THE INVENTION

Embodiments of a communication system, device, method, and non-transitory computer readable medium can be configured to provide a simple browsing apparatus that is server independent and allows reference to specific content on a web page.

For instance, embodiments of a method for referring to specific content on a web page comprises addressing the web page by way of a URL, wherein at least one extra part of the URL contains information on the specific content to be referred to on the web page. When the URL is modified by the one extra part of the URL being disregarded or omitted, the web page is addressed by way of the modified URL in that the specific content to be referred to on the web page is disregarded.

Since at least one extra part of the URL contains information on the specific content to be referred to on the web page this information is accessible independently of the used browsing program and can be read out each time the web page is addressed by the URL. Furthermore, there is no need for any service server as an additional information resource. For instance, when the one extra part of the URL is disregarded/omitted in a modified form of the URL, the web page is addressed by way of the modified URL in that the specific content to be referred to on the web page is disregarded the functionality of the web page is not limited such that it can be displayed by any browser even not supporting read out of the extra URL part. The referral may be in the form of highlighting the specific content with respect to the content which is non-specific. The highlighting may be in the form of underlining the special content, using bold and/or cursive font, and/or using a color which is different from the color of the non-specific content.

A preferred embodiment of the invention comprises displaying the web page thereby highlighting the specific content to be referred to. This embodiment allows an optimized information of a user and immediate reference such that the specific content is recognizable in a simple and immediate way by the user.

Embodiments of the invention can provide an advanced information service for the users of a web browsing system. For this purpose, the at least one extra URL part can contain information on at least one keyword, at least one phrase and/or at least one section to be referred to and/or highlighted on the web page.

In a highly preferred embodiment of the invention the web page is displayed by a browser. This embodiment makes possible an information of the user in a very simple and efficient way and allows the user to react to specific content on the web page immediately and individually.

For purpose of avoiding limited and/or failing web page display, typically, this highly preferred embodiment of the invention comprises verifying whether the browser can read the extra part of the URL and displaying the web page either by disregarding the specific content if the browser is unable to read the extra part of the URL, or otherwise displaying the web page along with the specific content.

A preferred embodiment of the invention comprises generating the at least one extra part of the URL by marking specific content to be referred to on the web page by a user, preferably by a cursor, and adding the corresponding extra part to the URL of the web page by a specific program, preferably integrated into a browser. This embodiment can enable a user to refer to specific content on a web page for different individual purposes, like use in other applications, documentation, etc. The respective extra part of the URL is created simply, e.g. by selecting the desired text with the mouse, opening the context menu and selecting the respective new entry "encapsulate highlighted part into URL".

A more efficient level of extra part generation is achieved by a preferred embodiment of the invention wherein the adding of the corresponding extra part to the URL is executed by a right-click (e.g. via a right click of a right-side button of a mouse pointer connected to a terminal device).

A URL input into a browser consists of several parts. An anchor-like fragment for identifying a location within the web page and where to scroll to identify keywords or phrases. In a preferred embodiment of the invention the used and/or generated extra part of the URL comprises a syntax of at least one character followed by an Equal-to-sign such as '##hl='. Occurrences of a given keyword or phrase other web page defined by the modified URL, e.g. ##hl="xyz", are automatically highlighted when displaying the web page defined by the modified URL. In this embodiment, the keyword or phrase is defined by the content following the Equal-to-sign in execution characters. The content may be a single character or a string of characters. In other embodiments the execution character may be missing or replaced by another sign/character or other signs/characters. The Equal-to-sign may be omitted or be replaced by another sign. The syntax may be of any form allowing to define a keyword or phrase to be referred to in the web page defined by the modified URL. The keyword or phrase may be arranged in the string of the URL before or after the syntax. There may be an intermediate character or several intermediate characters between the keyword or phrase and the syntax.

The keyword or phrase may be single character such as a letter or number/digit/numeral or a multitude thereof. A special sign is possible as well. The extra part generation and the web page display are simplified by another preferred embodiment of the invention wherein the at least one extra part of the URL is comprised by another URL as an extension of the other URL addressing the web page without the specific content to be referred to on the web page.

A user-friendly generation service can be provided by an embodiment of the invention wherein the URL containing the extra part of the URL is copied to a clipboard on a computer whereon the web page is addressed.

A web browsing system can comprise means for addressing a web page by way of a URL, means for displaying the web page and for thereby highlighting specific content to be referred to on the web page, wherein the system is able to read and/or to generate at least one extra part of the URL containing information on the specific content to be referred to on the web page in a way that, when the URL is modified by the one extra part of the URL being disregarded or omitted, the web page is addressed by way of the modified URL in that the specific content to be referred to on the web page is disregarded. This means may include a display device connected to a computer device having at least one input device connected to the computer device.

The user comfort can be increased by a preferred embodiment of the invention wherein the system comprises means for marking specific content to be referred to on the web page by a user, preferably via a cursor. The cursor may be manipulated by a user via input provided by at least one input device (e.g. a pointer such as a stylus, a mouse, or the finger of a user contacting a touch screen).

Another preferred embodiment of the invention is characterized in that the system comprises a graphical user interface for display of the web page to the user and for inputs of the user. This embodiment has the advantage of simple user input and user-friendly handling of the web browsing system.

Embodiments of the system can be integrated into a personal device, in particular a tablet or a smartphone or other type of electronic device that includes a processor connected to memory and at least one transceiver unit.

Further features and advantages of embodiments of the invention are disclosed by the enclosed drawings and the corresponding description. The features mentioned can be used in accordance with embodiments of the invention either individually or collectively in any combination. The embodiments mentioned are not to be understood as exhaustive enumeration but rather have exemplary character for the description of the invention.

BRIEF DESCRIPTION OF THE DRAWINGS

Exemplary devices, systems, and apparatuses for providing a generation of a display of specific content of a web page are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

Figure 1:
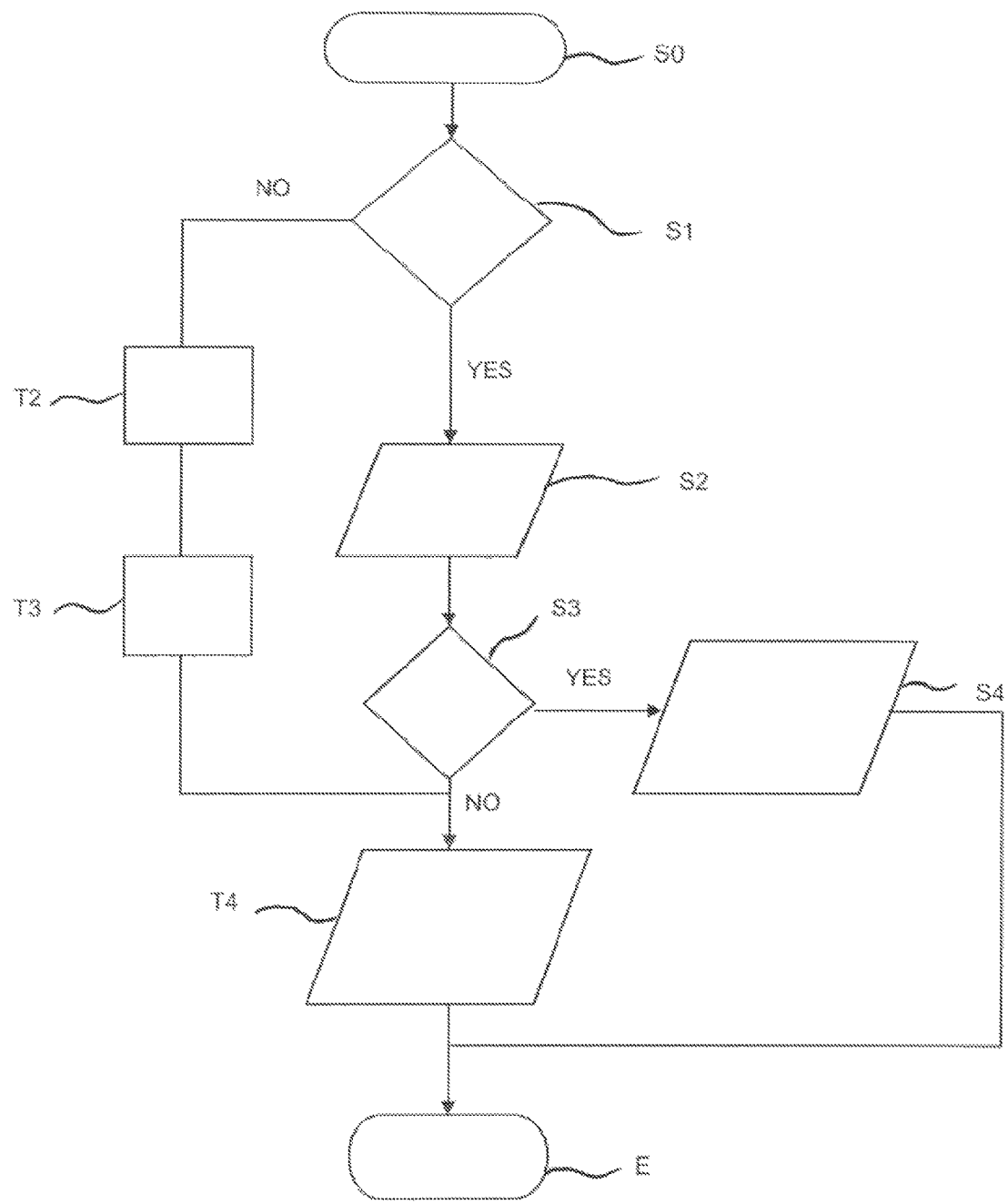
FIG. 1 is a block diagram of a method for displaying a web page according to an embodiment of the invention.

Referring to FIG. 1, in an initial step S0 a user can enter the URL in a browser or actuate a link by use of an input device connected to an electronic device such as a computer, smart phone, electronic tablet, or other type of communication terminal, thereby activating the URL. In succeeding first step S1 the system verifies whether the browser is compatible with extra URL parts if present. In case of YES the browser reads the URL without any restrictions in second step S2 and verifies in third step S3 whether the URL contains at least one extra URL part referring to specific content on the web page. In case of YES the browser renders the web page as usual and then highlights the specific content to be referred to in fourth step S4 so that this web page content is displayed with highlighted indicia on a display device to a user. Afterwards, the process comes to an end E.

In case of NO in the first step S1 the URL is sent normally in second alternative step T2 and best effort service is provided in third alternative step T3. Fourth alternative step T4 succeeds either the third alternative step T3 or the third step S3 in case of NO. In fourth alternative step T4 the browser renders the web page as usual. Afterwards, the process comes to the end E.

The extra URL part, e.g. a new field "hl" in the fragment part of the URL can be configured to cause the browser of the device that is generating the web page to display the web page so that particular content of the web page is highlighted. The extra URL part may be a new field "hl" or other fragment part. In some embodiments, another character or sign or several other characters/signs are possible instead of "hl". An advantage from use of such an extra URL part is the transfer of more information to the interested party when watching the web page with one click. For example, a user can introduce a field in the fragment part of the URL annotated with "##hl=abcd" as the extra part that will highlight all the occurrences of abcd as a keyword in the given web page when the generated link is actuated to render the web page in step S4. Web browsers may have to be adapted to support the extra URL part related feature. The extra URL part can be configured so that web browsers not supporting the highlight feature instruction indicated by the extra URL part will render the web page correctly since the "##hl='abcd'" part could be ignored by such browsers. For instance, the URL request of the extra URL part can be neglected from devices that do not support the extra URL part feature because it is in the fragment part of the URL (see alternative step T4).

Also, if the user wants to mark multiple keywords with the use of "+" symbol or the logical "OR". However, this is limited by the maximum number of characters that can be entered in a URL, which is currently 255. This can be shown on the example below:

http://www.unify.com/us/products-services/unified-
communications.aspx##hl="Applications"OR"Frost"

This can mark both the "Applications" keyword and the "Frost" keyword with all their occurrences by use of this exemplary extra URL part feature.

Another feature could be included in the extra URL part to give a highlighted keyword a different weighting by giving an associated highlighting color indication within the extra URL part format, such as, for example, yellow (e.g.

"##hly=. . .), red (e.g. "##hlr=. . .), blue (e.g. "##hlb=. . . ) and/or green (e.g. "##hlg=. . . ).

Figure 2:
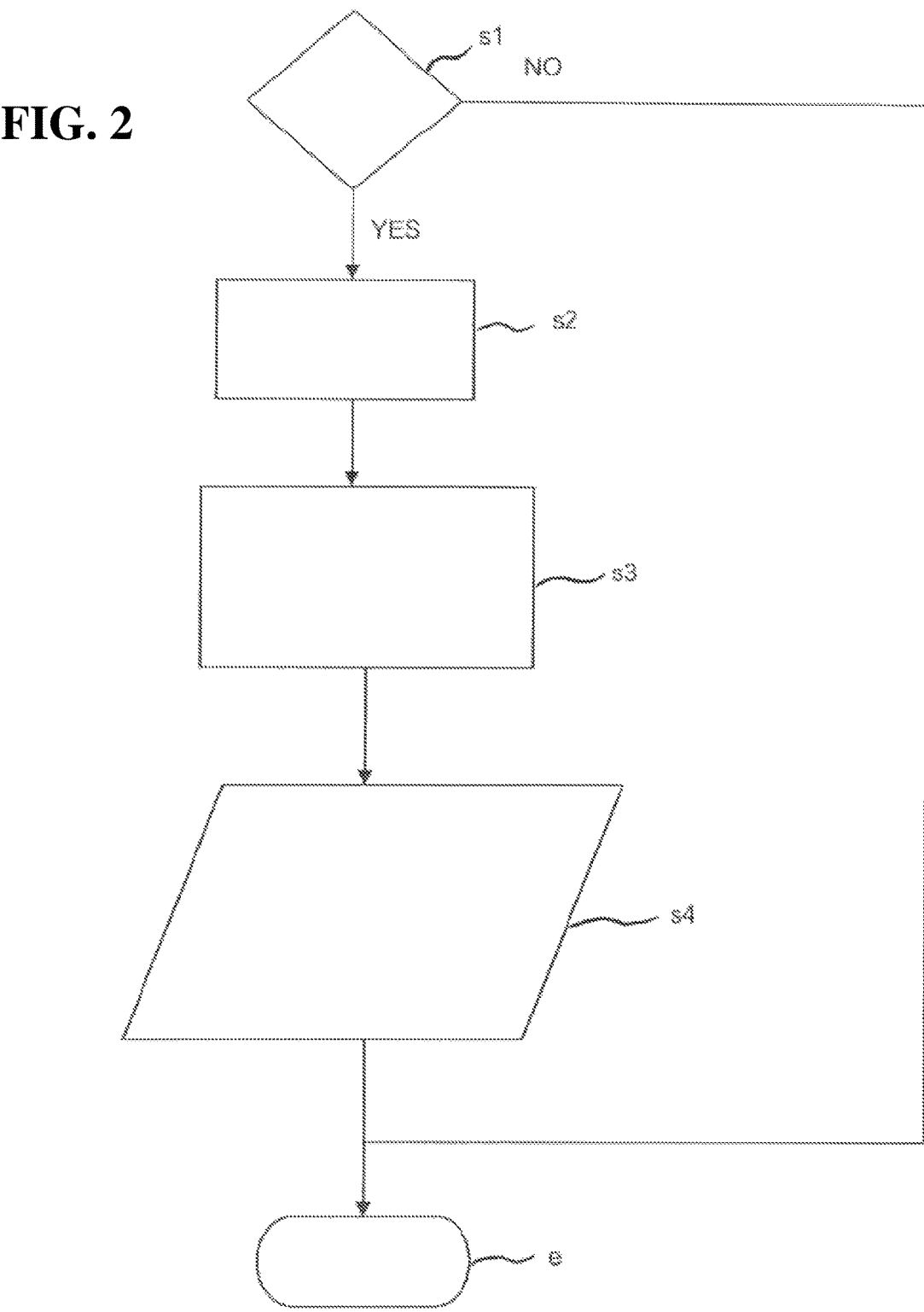
FIG. 2 is a block diagram of a method for generating an extra URL part referring to specific content on a web page according to an embodiment of the invention.
Figure 3:
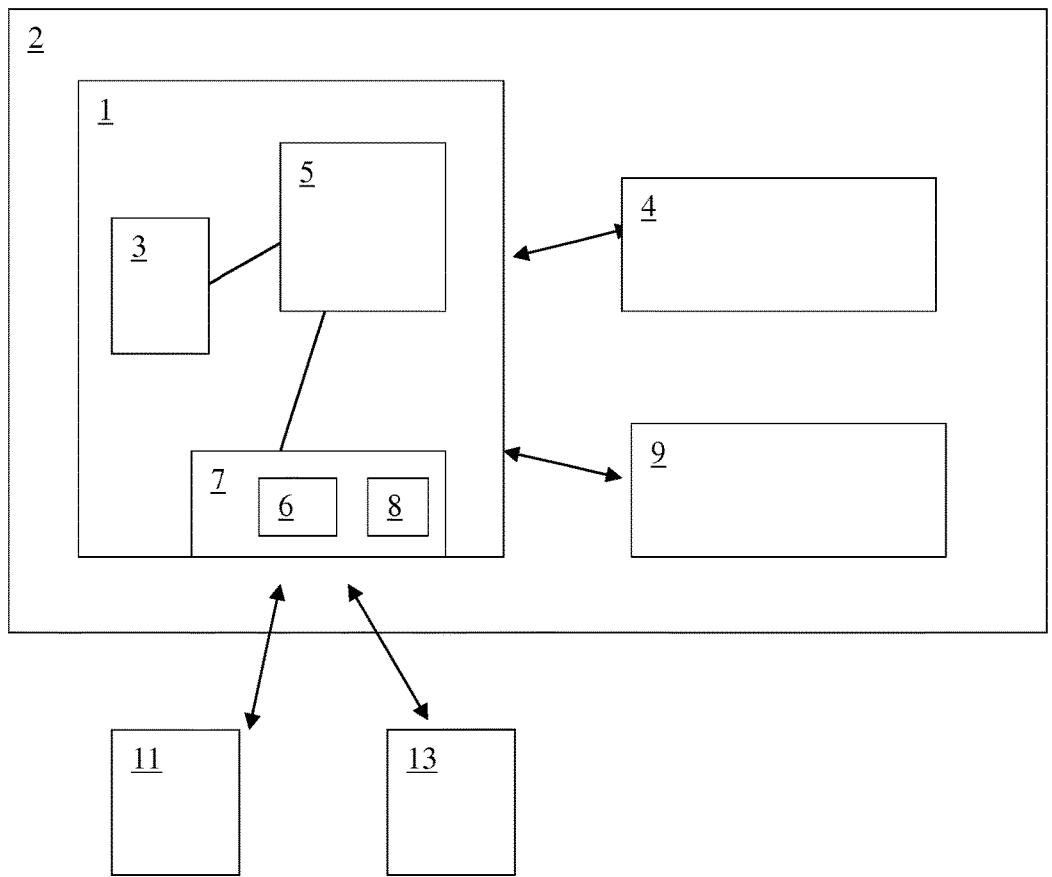
FIG. 3 is a block diagram of an exemplary embodiment of a system.

The illustration of FIG. 2 presumes a web page displayed to the user by a web browsing system 2. In first step s1 the system verifies whether the browser is compatible with extra URL part(s) that may be inserted into a pre-existing URL for causing a display of the webpage addressed at the original URL via a display device 4 to include highlighted content as defined in the extra URL part(s) to be added to the original URL. In case of YES the user marks with the mouse cursor or other pointer device or other type of input device 9 (e.g. stylus, use of finger on a touch screen etc.) the text that he or she intends to refer to and to send, respectively, in second step s2. The user selects the corresponding browser function as defined by code stored in a program 6 (e.g. a browser application, an application configured to interface with a browser application for generation of a URL having at least one extra URL part, a computer program or device program that defines one or more methods that may be performed by a device when a processor of the device executes the program) in non-transitory memory 7 that is coupled to a processor 5, e.g. by providing a first input via a right click mouse to provide a display of a menu feature such as an "Encapsulate highlighted part in URL and copy in clipboard" menu feature and then selects that feature in third step s3 (e.g. via providing of a second input made by a left click on the mouse used to call up the menu options). In a succeeding fourth step s4 the browser generates the extra URL part by reading the highlighted text and combining it with the current URL in response to the selection of the menu item. The generated URL that contains the original URL and the extra URL part can be generated so that it is included into a clipboard or other data store 8 in a memory location of the device 1 so that a paste operation can result in having that generated URL containing the extra URL part inserted into a web browser, word processor, or other communications related application file (e.g. an email message, a text message, an instant message, etc.) For instance, the user may then provide input by use of an input device 9 (e.g. a pointer device, a keyboard, a touch screen display, etc.) to instruct the web browsing system (e.g. a device 1 running a web browser program 6 such as, for example, a terminal device like a smartphone or tablet that has hardware including non-transitory memory 7 coupled to at least one processor 5 and at least one transceiver 3 coupled to at least one processor 5) to paste the generated URL into his or her browser to have the web page generated with highlighting of the content identified by the extra URL part appended to an end portion of the original URL that was previously generated. The user may also (or alternatively) provide input to paste the generated URL having the extra URL part into a text message, email, instant message, or other communication message for sending to other users of other terminal devices 11 and 13. When the recipient users receive that URL in a communication via that recipient user's terminal 11 or 13 device, they may provide input via a mouse, pointer or other input device to actuate the URL having the extra URL part. The browser run by the recipient's device may then generate the web page having the URL and highlight text in the webpage for display via a display device (e.g. touch screen display or liquid crystal display, etc.) of the device or connected to the device, a section of text in the web page, or other content of the web page based on the instructions conveyed by the extra URL part (e.g. highlighting of certain key words in green font or highlight a particular paragraph of text in yellow, etc.). In the event that recipient user's browser does not support the extra URL part, the actuation of the link may occur such that the webpage is displayed to that recipient without any highlighting by that browser device ignoring the extra part of the URL to generate the original web page content without any highlighting as defined by the extra URL part. Afterwards, the process comes to an end e.

In case of NO in the first step s1 no extra URL part is generated and the URL remains unmodified. Immediately, the process comes to the end e.

When the user wants to send a highlighted area of a given web page to another user he can have the functionality to encapsulate the highlight part into the web page's URL, (see the encapsulation of the selected text into the URL with the right-click pop-up option in FIG. 2 and as discussed herein).

For example, if the URL is http://www.unify.com/us/products-services/unified-communications.aspx then after the above procedure the copied link can be http://www.unify.com/us/products-services/unified-communications.aspx##hl="Applications "e.g. with the ##hl="Applications being the extra part of the URL added to the original URL). That link may then be included in a message (e.g. a text message, email, instant message, social network application message such as direct message using the Twitter application or a comment posting on a website, etc.) that is subsequently sent to a device associated with the addressed user (e.g. an email server, user device, web server, etc.).

A technical feature or several technical features which has/have been disclosed with respect to a single or several embodiments disclosed herein before, e.g. verifying whether the browser is compatible with an extra URL part if present according to first step s1, S1 in both FIGS. 1, 2, may be present also in another embodiment, e.g. copying the URL containing the generated extra URL part into the clipboard according to step s4 in FIG. 2, except it is/they are specified not to be present or it is impossible for it/them to be present for technical reasons.

While certain exemplary embodiments of a communication device, a communication system, and methods of making and using the same have been shown and described above, it is to be distinctly understood that the invention is not limited thereto but may be otherwise variously embodied and practiced within the scope of the following claims.

What is claimed is:
1. A method for referring to specific content on a web page having a first uniform resource locator (URL) for a modified display of the web page via a display device connected to a device running a browser, comprising:
displaying the web page having the first URL via a display device connected to the device running the browser;
generating at least one extra part for a second URL by marking specific content on the displayed web page via an input device communicatively connected to the display device to generate the extra part of the second URL based on the marking of the specific content and subsequently generating the extra part of the second URL based on the marking for formation of the second URL, the at least one extra part containing information on the specific content to be referred to on the web page;
wherein, the extra part of the second URL is configured so that when the web page of the first URL is generated to be displayed via the browser, the specific content of the web page is highlighted for a browser that supports the extra part of the second URL such that the device running the browser causes a display of the web page on the display device with the specific content of the web page highlighted based on the extra part of the second URL, and wherein the extra part of the second URL is also configured to be disregarded or omitted by a browser that does not support the extra part of the second URL such that the web page is addressed by way of the first URL included within the second URL without use of the extra part so that the extra part is disregarded;

adding the at least one generated extra part to an end of the first URL of the web page by the device running the browser to generate the second URL and storing the second URL having the at least one extra part in non-transitory memory of the device running the browser as a data store of the device running the browser for subsequently including the second URL having into a message for sending to an addressee; and sending the message including the second URL as a link such that actuation of the link causes the web page to be displayed with the specific content of the web page being highlighted for a browser that supports the at least one extra part of the second URL such that the web page is addressable by way of the second URL having the at least one extra part.

2. The method according to claim 1 comprising:
displaying the web page via the display device connected to the device running the browser based on each extra part of the second URL such that the specific content to be referred to as defined in the extra part is highlighted.

3. The method according to claim 2, wherein each extra part contains information on at least one keyword, at least one phrase and/or at least one section to be-highlighted on the web page.

4. The method according to claim 3,
wherein the displaying of the web page having the first URL via the display device connected to the device running the browser is initiated via the first URL prior to generation of the at least one extra part for display of content of the web page via the display device and subsequent identification of specific content to be highlighted for generation of at least one extra part.

5. The method according to claim 1 comprising:
verifying whether the at least one extra part of the second URL is readable by the browser of the device running the browser; and one of:
displaying the web page by disregarding the at least one extra part and specific content to be highlighted and/or referred to via the at least one extra part when the browser is unable to read the extra part of the second URL such that the first URL is used for displaying the web page, and
displaying the web page with the specific content as defined by the at least one extra part of the second URL being highlighted when the at least one extra part is readable by the browser.

6. The method according to claim 5, wherein:
the adding of the at least one generated extra part to the first URL of the web page to form the second URL is performed via a specific program integrated into the browser of the device that was run to display the webpage to store the second URL having the extra part in the non-transitory memory of the device as the data store of the device.

7. The method according to claim 6, wherein the input device is a pointer device, and wherein the generating of the at least one extra part of the second URL by marking specific content to be referred to on the web page via the input device comprises adding at least one extra part to the first URL in response to a right-click of the pointer device.

8. The method according to claim 7, wherein the generated extra part of the second URL comprises a syntax of at least one character followed by an Equal-to-sign.

9. The method according to claim 8, wherein the at least one extra part of the second URL is comprised by at least one identifier identifying the specific content to be highlighted for appending to an end of the first URL to form the second URL.

10. The method according to claim 6, wherein the second URL containing the extra part is copied to a clipboard of the device such that the second URL having the extra part is subsequently pasteable into the browser or the message.

11. A non-transitory computer readable medium having a computer program stored thereon that is configured such that a device running the program performs the method of claim 1.

12. A web browsing system comprising:
a display device and a non-transitory computer readable medium connected to a processor, the system configured to address a web page by way of a uniform resource locator (URL),
the system configured to display the web page via a first URL of the web page and highlight specific content to be referred to on the web page via the display device,
the system configured to generate at least one extra part to form a second URL, the second URL having the first URL and the at least one extra part added thereto, the at least one extra part containing information on specific content of the web page to be referred to on the web page identified via input that marked the specific content of the web page, the at least one extra part defining how that specific content is to be displayed so that when the first URL is modified by each extra part of the second URL the web page is addressable by way of the second URL in that the specific content to be referred to on the web page is displayed as defined by the extra part; and
wherein each extra part of the second URL is configured such that the second URL having each extra part is displayable as only defined by the first URL without reference to any extra part for a device that does not support functionality of the extra part; and
wherein, each extra part of the second URL is configured so that the web page is displayed so that the specific content is highlighted as defined by the extra part when a device supports the extra part;
the system configured to store the second URL having the at least one extra part in the non-transitory computer readable medium as a data store for subsequently including the second URL having the at least one extra part into a message for sending to an addressee; and
the system configured to send the message including the second URL as a link so that actuation of the link causes the web page to be displayed with the specific content of the web page being highlighted for a browser that supports the at least one extra part of the second URL such that the web page is addressable via the second URL having the at least one extra part.

13. The system according to claim 12 wherein the system is configured so that marking specific content to be referred to on the web page by a user is performed via manipulation of a cursor displayed via the display device by manipulation of an input device.

14. The system according to claim 13 wherein the system is configured so that the display device displays a graphical user interface to display the web page to the user and for displaying information relating to received inputs from at least one input device utilizable by the user.

15. The system of claim 12, wherein the system is a communication terminal device.

16. The system of claim 15, wherein the communication terminal device is a smart phone or is a tablet.

17. The system of claim 12, wherein the extra part is appended to an end of the first URL to form the second URL containing the extra part.

18. The system of claim 17, wherein the extra part comprises a syntax of at least one character followed by an Equal-to-sign (=).

19. The system of claim 18, wherein the second URL containing the extra part is storable in the data store such that the second URL having the extra part is subsequently pasteable into the message that is sendable to at least one addressee.

* * * * *